US006982657B2

(12) United States Patent
Kinugawa et al.

(10) Patent No.: US 6,982,657 B2
(45) Date of Patent: Jan. 3, 2006

(54) METHOD AND APPARATUS FOR DISPLAYING OPERATION STATUS OF CONSTRUCTION MACHINE, AND CONSTRUCTION MACHINE THEREFOR

(75) Inventors: Hideki Kinugawa, Hiroshima (JP); Hisashi Kadowaki, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 0 days.

(21) Appl. No.: 09/956,008

(22) Filed: Sep. 20, 2001

(65) Prior Publication Data

US 2002/0033833 A1 Mar. 21, 2002

(30) Foreign Application Priority Data

Sep. 20, 2000 (JP) .............................. 2000-284887

(51) Int. Cl.
*G08G 1/123* (2006.01)
(52) U.S. Cl. .................... 340/990; 340/995.1; 340/988; 340/425.5; 340/457.4; 340/679; 345/629
(58) Field of Classification Search ................ 340/990, 340/988, 989, 995.1, 870.16, 870.05, 870.06, 340/691.6, 500, 679, 684, 425.5, 457.4; 701/50, 701/29, 33; 345/629
See application file for complete search history.

(56) References Cited

U.S. PATENT DOCUMENTS 5,475,597 A * 12/1995 Buck ........................... 340/988
5,646,845 A    7/1997 Gudat et al.
5,714,946 A *  2/1998 Gottshall et al. ......... 340/870.16
5,719,563 A    2/1998 Thompson, Jr.
6,169,948 B1 * 1/2001 Fujishima et al. .......... 340/500
6,452,505 B1 * 9/2002 Taglioni ................. 340/870.02

FOREIGN PATENT DOCUMENTS

| EP | 0 989 525    | 3/2000  |
|----|--------------|---------|
| JP | 7-277699     | 10/1995 |
| JP | 8-56377      | 2/1996  |
| JP | 9-32039      | 2/1997  |
| JP | 9-144587     | 6/1997  |
| JP | 9-164923     | 6/1997  |
| JP | 11-36381     | 2/1999  |
| JP | 11-334806    | 12/1999 |
| JP | 2000-20629   | 1/2000  |
| JP | 2000-76505   | 3/2000  |
| JP | 2000-99143   | 4/2000  |
| WO | WO 00/55827  | 9/2000  |

* cited by examiner

*Primary Examiner*—Hung T. Nguyen
(74) *Attorney, Agent, or Firm*—Oblon, Spivak, McClelland, Maier, & Neustadt, P.C.

(57) ABSTRACT

The present invention provides a method for displaying an operation status of a construction machine by sensing operating information of the construction machine by means of a coolant water sensor and the like, sending the operating information to a control computer while the control computer receives the operating information which has been sent from the construction machine, determines whether the construction machine is in operation or not based on the received operating information, and displays the result of judgment on a monitor screen, so that the current operation status of the construction machine can be known easily.

7 Claims, 6 Drawing Sheets

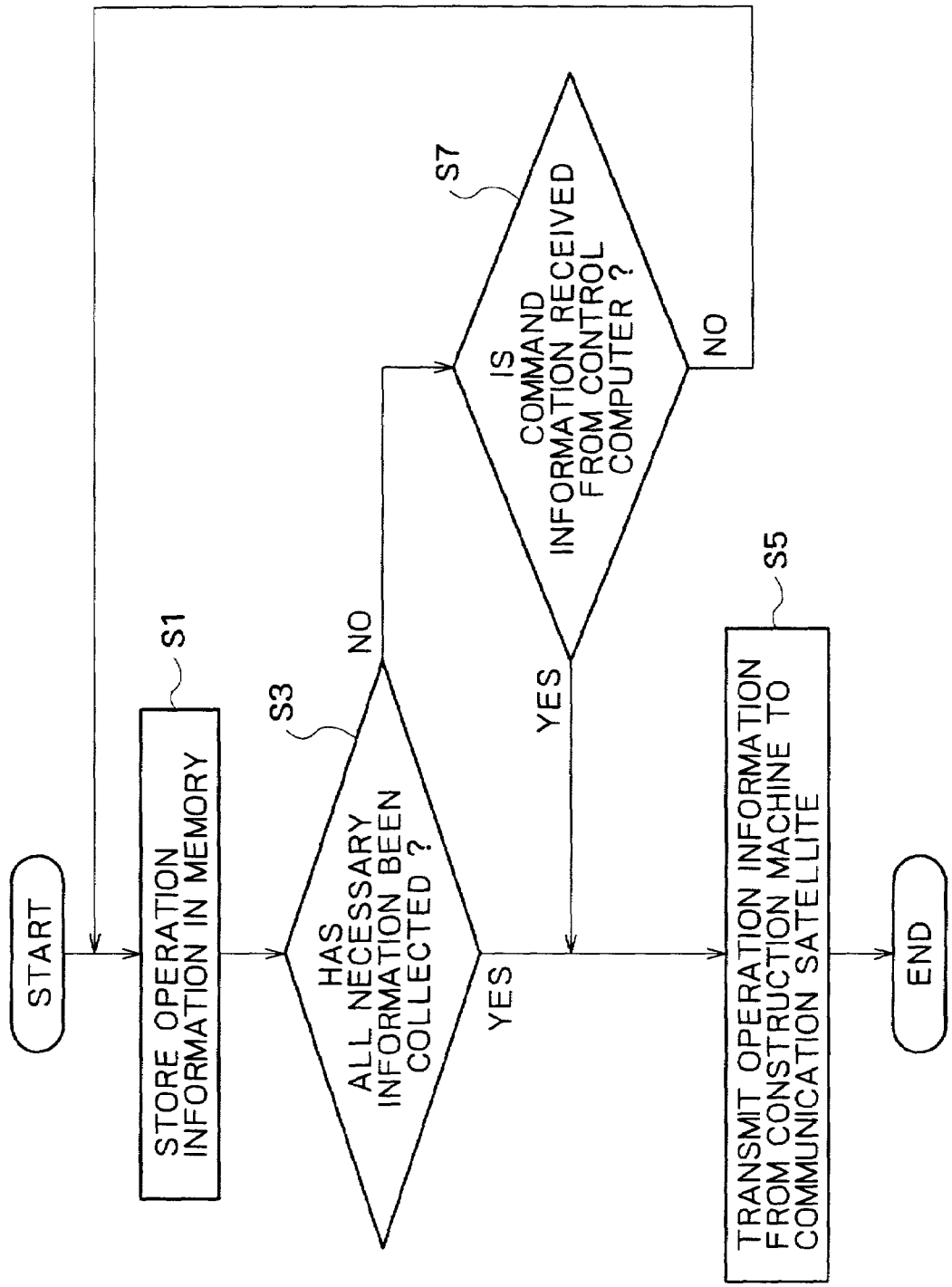

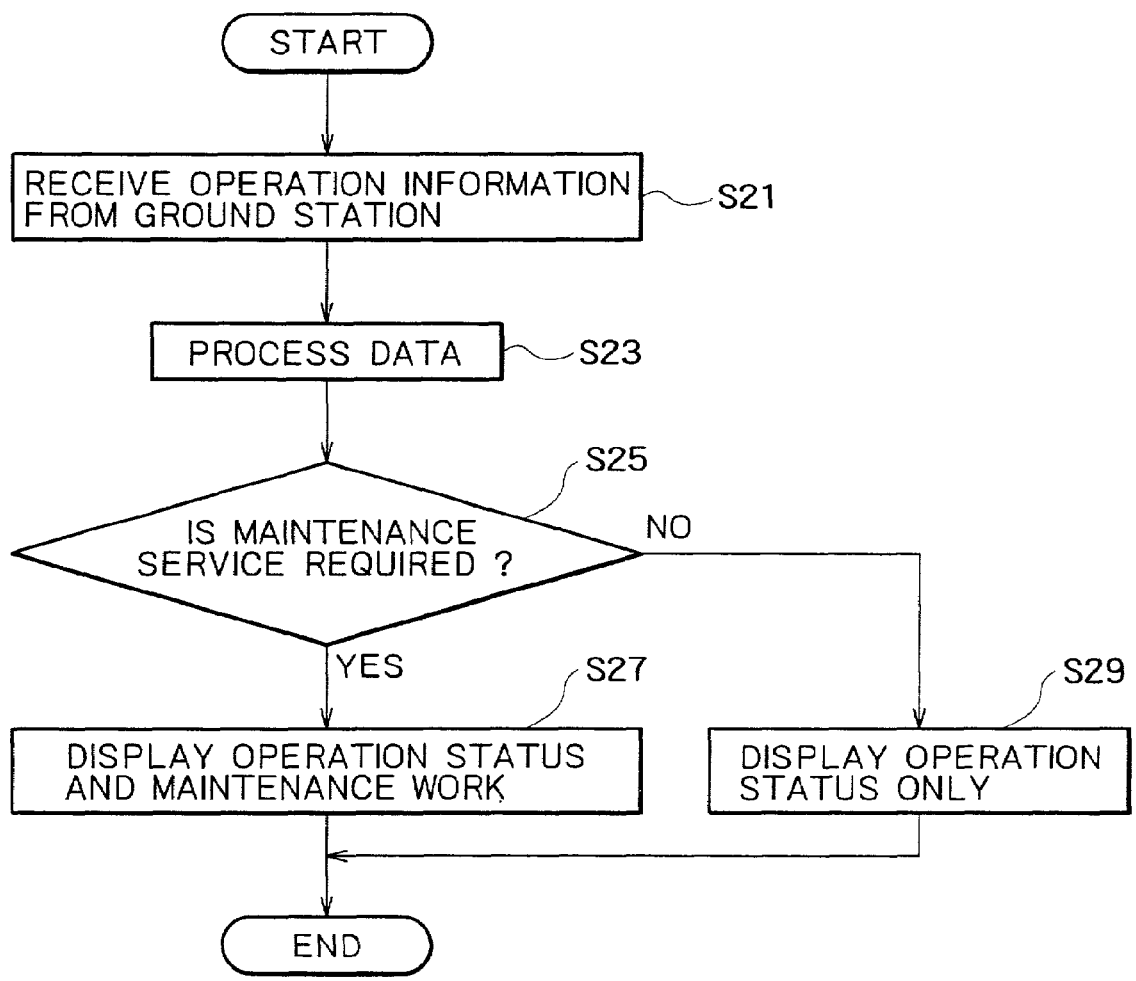

METHOD AND APPARATUS FOR DISPLAYING OPERATION STATUS OF CONSTRUCTION MACHINE, AND CONSTRUCTION MACHINE THEREFOR

BACKGROUND OF THE INVENTION

1. Field of the Invention

The present invention relates to a method, an apparatus and a system for displaying the operation status of construction machines.

2. Description of the Related Art

A construction machine in a narrow sense thereof such as the hydraulic excavator which are not allowed to travel on public roads, and construction equipments which have no traveling means such as power generator (hereinafter collectively called a construction machine) are unable to move to a service shop or a maintenance shop by their own power. Even a construction machine that is allowed to travel on public roads is rarely interrupted in the operation thereof at a work site and driven to the service shop. Thus the construction machines have been subjected to maintenance services by mechanics who are dispatched to the work site upon request.

In some cases the work site is located in a mountainous area or an out-of-the-way place, in which case it is difficult to constantly monitor the operation status of the construction machine. In case a mechanic visits the work site while the construction machine to be serviced is in operation, the mechanic must wait for the end of scheduled operation of the construction machine to commence servicing. The mechanic may also have to leave and revisit the work site to fetch replacement part(s) depending on the type of maintenance work required, thus making the service job very time-consuming.

SUMMARY OF THE INVENTION

An object of the present invention is to provide a method, an apparatus and a system for displaying an operation status of a construction machine, which make it easier to monitor the operation status.

The method for displaying the operation status of the construction machine according to the present invention has a constitution as described below.

Operating information obtained from the construction machine is sent to a control device which can communicate with the construction machine so that the control device receives the operating information, determines whether the construction machine is in operation or not and displays the result of judgment on a monitor screen of the control device.

An operation status display device for the construction machine, provided on the control device that can communicate with the construction machine, that is a display device to implement the method described above, has the following constitution.

Receiver which receives the operating information of the construction machine that is sent from the construction machine, operation status judging means which determines whether the construction machine is in operation or not according to the operating information and operation status display means which displays the result of judgment by the operation status judging means are provided.

In this case, the operation status of the construction machine is monitored substantially in real-time by a control computer used as the control device, based on the operating information received from the construction machine. The control computer determines whether the construction machine is in operation or not according to the operating information that has been received by the control computer. The result of judgment is displayed on a monitor screen used as the display means. This makes it possible to know the timing of doing maintenance service, thus eliminating the need to keep the service man waiting for the end of the operation of the construction machine before starting maintenance service thereof. Thus the construction machine can be maintained or fixed at a proper timing.

BRIEF DESCRIPTION OF THE DRAWINGS

FIG. 5 is a flow chart explanatory of the operations of sending and receiving information on the construction machine side of the system shown in FIG. 1; and FIG. 6 is a flow chart explanatory of the operations of sending and receiving information on the control computer side of the system shown in FIG. 1.

DESCRIPTION OF THE PREFERRED EMBODIMENTS

Some preferred embodiments of the present invention will now be described below with reference to FIG. 1 through FIG. 6. This is merely an embodiment of the present invention, and does not restrict the present invention.

Figure 1:
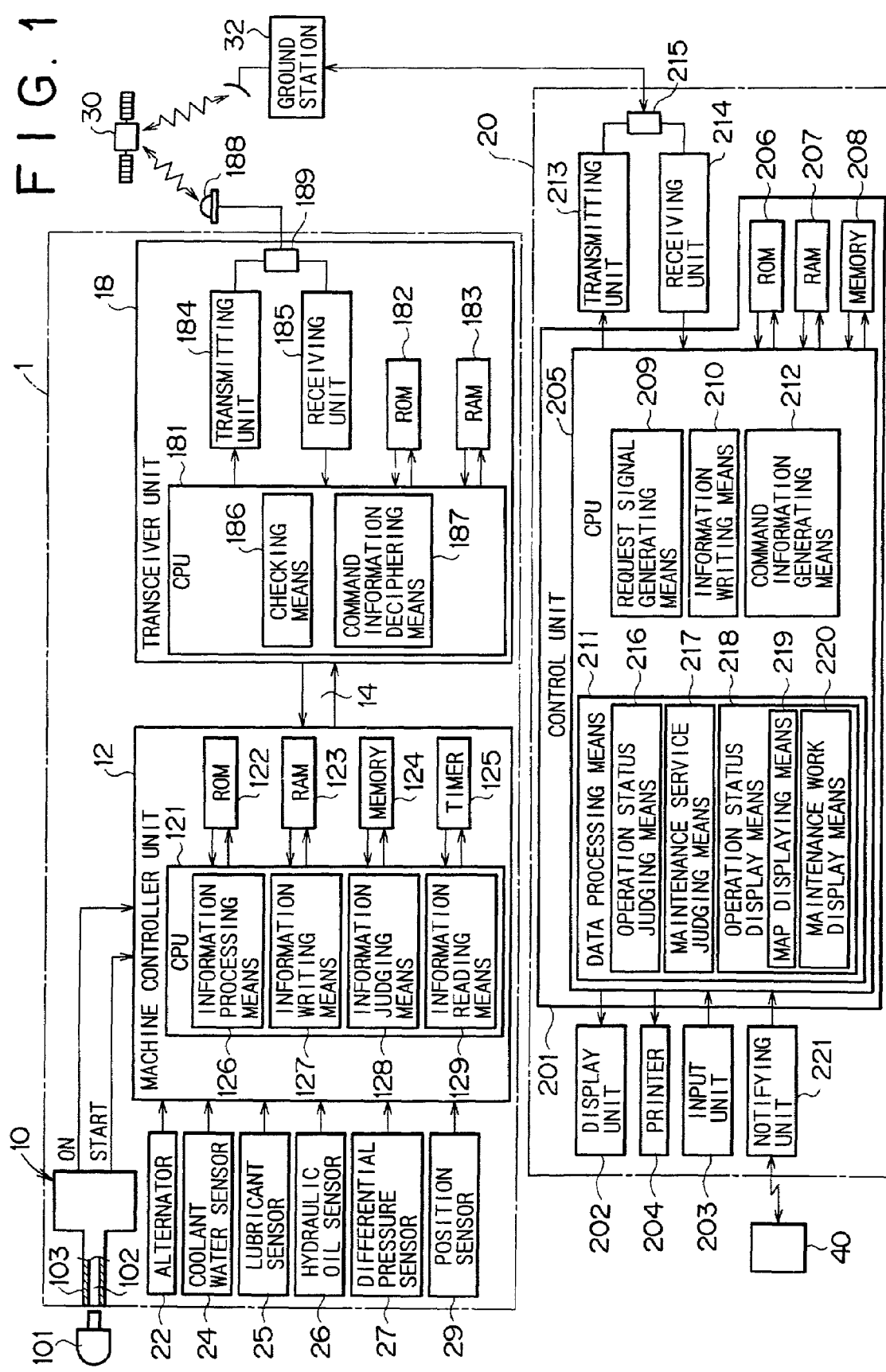
FIG. 1 shows the constitution of a system comprising an apparatus to which the method for displaying the operation status of construction machine according to one embodiment of the present invention is applied.

FIG. 1 schematically shows the constitution of a system comprising an apparatus to which the method for displaying the operation status of a construction machine according to one embodiment of the present invention is applied. This system comprises a construction machine 1 such as hydraulic excavator and a control computer 20 that exchanges information with the construction machine 1 via a communication satellite 30 and a base station 32.

The construction machine 1 comprises a key switch unit 10 wherein a starter key 101 is inserted to start the engine, a machine controller 12 which receives output signals from the key switch unit 10 and a transceiver (a transmitter-receiver) 18 which exchanges information via the communication satellite 30 with the base station 32.

The key switch unit 10 has a keyhole 102 wherein the starter key 101 is inserted. The unit 10 has a key switch 103 which can be switched between "LOCK" position where the starter key 101 can be inserted and removed, "ON" position and "START" position.

The machine controller 12 comprises a CPU (Central Processing Unit) 121 which carries out predetermined calculation/control operations, a ROM (Read-Only Memory) 122 which stores predetermined control programs, a RAM (Random Access Memory) 123 which temporarily stores data to be processed, electrically rewritable memory 124 such as EEPROM (Electrically Erasable Programmable Read Only Memory) and flash EEPROM which stores operating information including the information related to fuel replenishment, and a timer 125 which has calendar function and shows the time.

The CPU 121 comprises information processing means 126 which carries out a predetermined processing operation on the operating information such as calculation of the date and time when the engine is started and stopped and the current position of the machine, to be described later, information writing means 127 which stores the operating information and the clock information in the memory 124, information reading means 129 which reads out the operating information stored in the memory 124, and information judging means 128. The information judging means 128 checks the presence of the operating information stored in the memory 124 and, when it is determined that all information related to the maintenance service has been collected such as the calculated values of the date and time when the engine was started and stopped and the current position or location of the machine, and the information related to the quantity of coolant water, causes the information reading means 129 to read the operating information stored in the memory 124.

Connected to the machine controller 12 are the unit 10 to which the starter key 101 is inserted, an alternator 22 which constitutes a power supply of the construction machine 1 together with a battery, a coolant water sensor 24 installed in a coolant tank which holds the engine coolant water, a lubricant sensor 25 installed in an lubricating oil tank which holds the engine oil, a hydraulic oil sensor 26 installed in a hydraulic oil tank which holds hydraulic oil for each attachment, a differential pressure sensor 27 installed in a differential pressure sensing line of an air filter, and a position sensor 29 which senses the position or location of the construction machine 1. Signals from these sensors are input to the machine controller 12.

Among the devices described above, the coolant water sensor 24, the lubricant sensor 25, the hydraulic oil sensor 26, the differential pressure sensor 27 and the position sensor 29 constitute sensors which sense the operating information related to the maintenance service of the construction machine 1. The position sensor 29 may utilize, for example, the GPS (Global Positioning System). The GPS is a high-precision positioning system that determines the two-dimensional position (latitude and longitude) of a receiver based on data that is sent from at least three artificial satellites (GPS satellites) and is received by the receiver moving on the ground.

When the starter key 101 is inserted into the key hole 102 and the key switch 103 is turned from the "LOCK" position through the "ON" position to the "START" position, the machine controller 12 turns on a starter motor thereby to start the engine of the construction machine 1 to operate. The controller 12 also controls the operations of the construction machine 1 as a whole. As the engine starts to run, signals from the alternator 22, the coolant water sensor 24, the lubricant sensor 25, the hydraulic oil sensor 26, the differential pressure sensor 27 and the position sensor 29 are input to the controller 12. The input signals are subjected to predetermined processing operations carried out by the information processing means 126. Results of the data processing operations are stored as the operating information in the memory 124 in conjunction with the clock information received from the timer 125. This makes it possible to collect the operating information of the construction machine 1 such as the date and time when the engine was started, the date and time when the engine was stopped, quantity of the engine coolant water, quantity of the engine oil, quantity of the hydraulic oil, differential pressure of the filter, working position and so on.

The date and time when the "START" signal is output from the key switch 103 and a power generation signal is output from the alternator 22 as the engine started is stored as the engine starting date and time. The date and time when the engine is stopped so that the "ON" signal output from the key switch 103 is end and the power generation signal output from the alternator 22 is end is stored as the engine stopping date and time.

When quantity of the engine coolant water drops below a predetermined level, the coolant water sensor 24 outputs "ON" signal, which is stored as the operating information. When quantity of the engine oil drops below a predetermined level, the lubricant sensor 25 outputs "ON" signal, which is stored as the operating information. When quantity of the hydraulic oil drops below a predetermined level, the hydraulic oil sensor 26 outputs "ON" signal, which is stored as the operating information. When the differential pressure of the air filter exceeds a predetermined level, the differential pressure sensor 27 outputs "ON" signal, which is stored as the operating information. These predetermined levels are set with sufficient margins so that the construction machine 1 can operate without trouble after the corresponding signals are output till a mechanic arrives.

Current position is calculated from the signal that is output from the position sensor 29. Specifically, the position sensor 29 receives data sent from the GPS satellites and outputs a signal that is used to calculate the current position information of the construction machine 1. The calculated value is stored in the memory 124.

The operating information stored in the memory 124 is read from the memory 124 and is sent to the transceiver 18 via a connecting cable 14 when all the necessary information is collected. Timing of sending the signal is set so that the operating information is sent to the control computer 20 almost in real-time when the construction machine 1 is in operation.

The transceiver 18 comprises a CPU 181 which carries out predetermined calculation/control operations, a ROM 182 which stores predetermined control programs and identification information (ID code) which represents the model and machine number of the construction machine 1, a RAM 183 which temporarily stores the data to be processed, a transmitting unit 184 which sends the operating information that has been read from the memory 124 and the identification information that has been read from the ROM 182 to the ground station 32 via the communication satellite 30, and a receiver 185 which receives the identification information and command information sent from the control computer 20 via the ground station 32 and the communication satellite 30.

The CPU 181 has checking means 186 which compares the identification information sent from the control computer 20 with the identification information stored in the ROM 182 to determine whether both pieces of information agree or not, and command information deciphering means 187 which deciphers the command information sent from the control computer 20 in case the two pieces of information are identical. The transmitting unit 184 and the receiving unit 185 have antenna 188 connected thereto via a duplexer 189 in order to communicate with the communication satellite 30. The operating information stored in the memory 124 is deleted after being sent to the ground station 32.

The control computer 20 is constituted from, for example, a personal computer. The control computer 20 (hereinafter may be abbreviated as control PC or PC) receives the operating information of the construction machine 1 sent from the ground station 32 and processes the operating information thereby to control the construction machine 1. The control PC 20 has a control unit 201 which controls the operations of the computer as a whole, a display unit 202 comprising a monitor such as CRT which displays the operating information that has been processed, an input unit 203 such as a keyboard which inputs the control signal and other data to the control unit 201 and a printer 204 which prints out the operating information and other data that has been processed.

The control unit 201 has a CPU 205 which carries out predetermined calculation/control operations, a ROM 206 which stores predetermined control programs, map information including road information around the work site and the identification information, a RAM 207 which temporarily stores the processed data and a rewritable memory 208 such as EEPROM or flash EEPROM which stores the identification information and the operating information of the construction machine 1 to be controlled.

The CPU 205 has request signal generating means 209 which requests the ground station 32 to send the identification information and the operating information of the construction machine 1 stored in a memory (not shown) of the ground station 32, information writing means 210 which stores the identification information and operating information that has been sent in the memory 208, data processing means 211 which carries out the predetermined data processing operations (judging whether the construction machine is in operation or not, necessity of maintenance service, etc.) for each piece of identification information (for each construction machine) upon the operating information stored in the memory 208, and command information generating means 212 which commands the construction machine 1 to send the operating information which is stored in the memory 124.

The data processing means 211 has operation status judging means 216 which determines whether the construction machine is in operation or not according to the information received from the construction machine 1, maintenance service judging means 217 which determines from the information described above whether the construction machine 1 would need maintenance service including fixing in the near future or not, operation status display means 218 which displays the result of judgment by the operation status judging means 216 on the monitor screen of the display section 202, and a notifying unit 221 which sends the information displayed by the operation status display means 218 to a person in charge of the construction machine or to a portable terminal 40 of a mechanic.

The operation status display means 218 has map displaying means 219 and maintenance work display means 220. The map display means 219 displays, in addition to the result of judgment by the operation status judging means 216, the position information of the construction machine 1 included in the received information described above on the monitor screen of the display section 202. For example, the monitor screen of the display section 202 displays the map of the area at least around the construction machine 1 and shows a symbol representing the results of judgment by the operation status judging means 216 superimposed thereon at a position in the map that corresponds to the position information.

When it is determined by the maintenance service judging means 217 that the construction machine must be serviced, the maintenance work display means 220 displays the item of required maintenance works together with the result of judgment by the operation status judging means 216 on the monitor screen of the display section 202.

The information described above includes the position information of the construction machine, which is displayed along with the operation status information on the monitor screen. Since this makes the position of the construction machine to be needed for the service known easily, it becomes unnecessary to search for the position. Thus dispatching the mechanic to the work site for maintenance work can be made more efficient.

In case the position information is acquired by the use of GPS, precise position information can be obtained for a construction machine located at a remote work site.

As described above, operation status of the construction machine can be grasped visually when the map of the area around the construction machine is displayed on the monitor screen while the symbol representing the result of judgment is shown superimposed thereon at a position in the map that corresponds to the position information. Thus dispatching the mechanic to the construction site can be made more efficient.

The control computer determines whether it is necessary to provide the construction machine with maintenance service or not, based on the operating information that has been received as described above. When it is determined that the maintenance service is necessary, required maintenance works are displayed on the monitor screen together with the result of judgment of whether the construction machine is in operation or not. In this case, since replacement parts required for the maintenance works can be prepared before dispatching the mechanic, such a trouble can be avoided as the mechanic finds that the maintenance works cannot be done due to a missing part upon arriving the work site.

The CPU 205 is connected to a transmitting unit 213 which sends command information to the ground station 32 and a receiving unit 214 which receives the identification information and the operating information that are sent from the ground station 32, so as to be capable of communicating with the ground station 32 via a DUS (Digital Service Unit) 215.

In this embodiment, as described above, the operating information of the construction machine 1 is stored temporarily in the memory 124 and is transmitted via the communication satellite 30 to the control PC 20. The control PC 20 determines whether the construction machine is in operation or not based on this information, and displays the result of judgment on the monitor screen of the display unit 202. Specifically, the control PC 20 reads the operating information (position information) from the memory 208 and reads the map information of the area around the construction machine 1 and the identification information of the construction machine 1 from the ROM 206 and displays this information on the monitor screen of the display unit 202. At the same time, a symbol representing the result of judgment (for example, a mark of ●: when the construction machine is in operation and a mark of ○: when not in operation) is displayed being superimposed at the position corresponding to the position information on the map. Any suitable symbol may be used for this purpose.

When it is determined, from the information which has been received, that the construction machine 1 needs to be serviced for maintenance, the required maintenance works such as supplement of an engine coolant, an engine oil and so on and whether the construction machine is in operation or not are displayed on the monitor screen of the display unit 202. Specifically, the operating information (such as shortage of engine coolant water) is read from the memory 208 and is displayed as the maintenance work together with the symbol on the monitor screen of the display unit 202.

Figure 2:
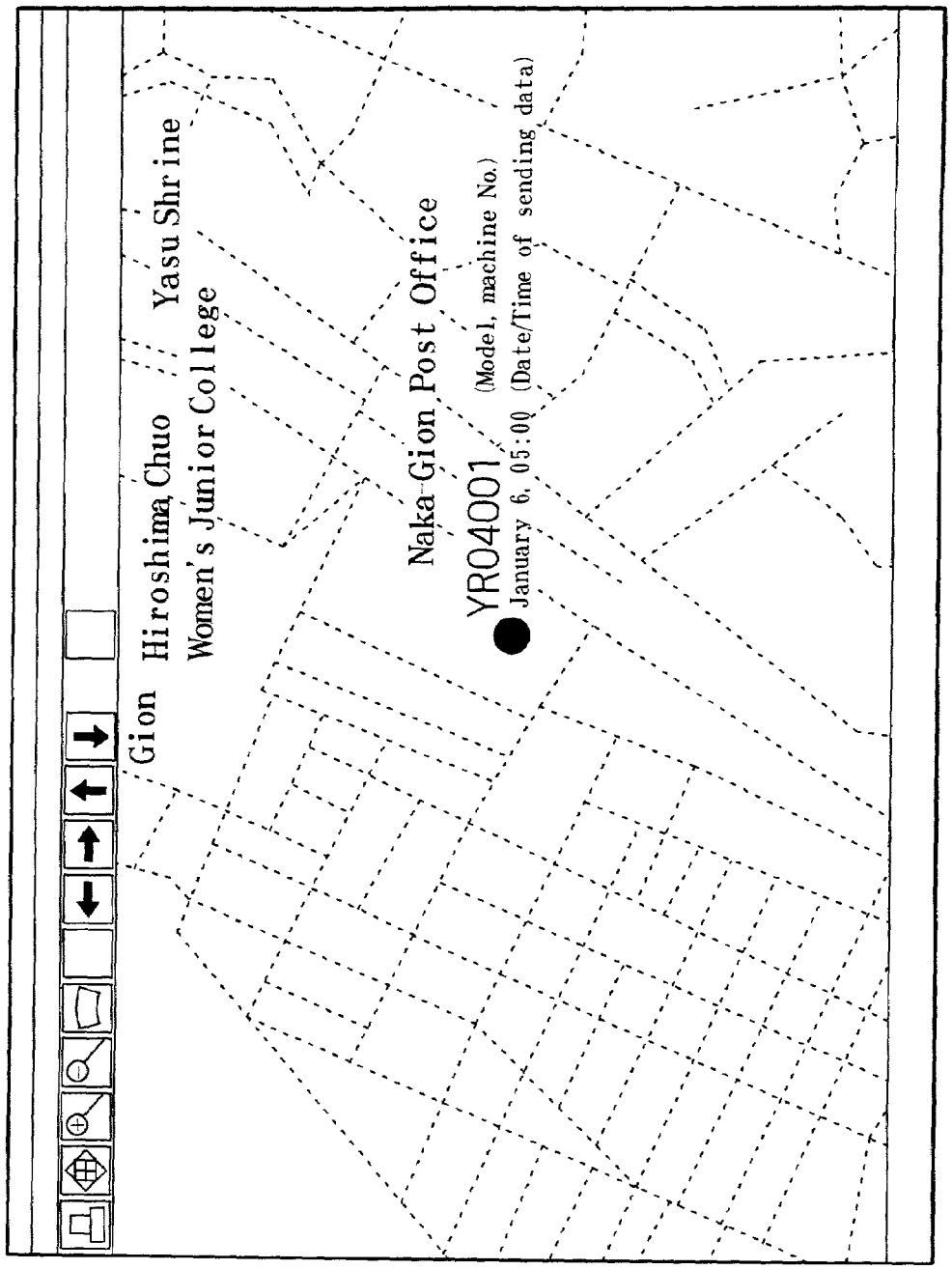
FIG. 2 shows an example of control screen according to one embodiment of the present invention.
Figure 3:
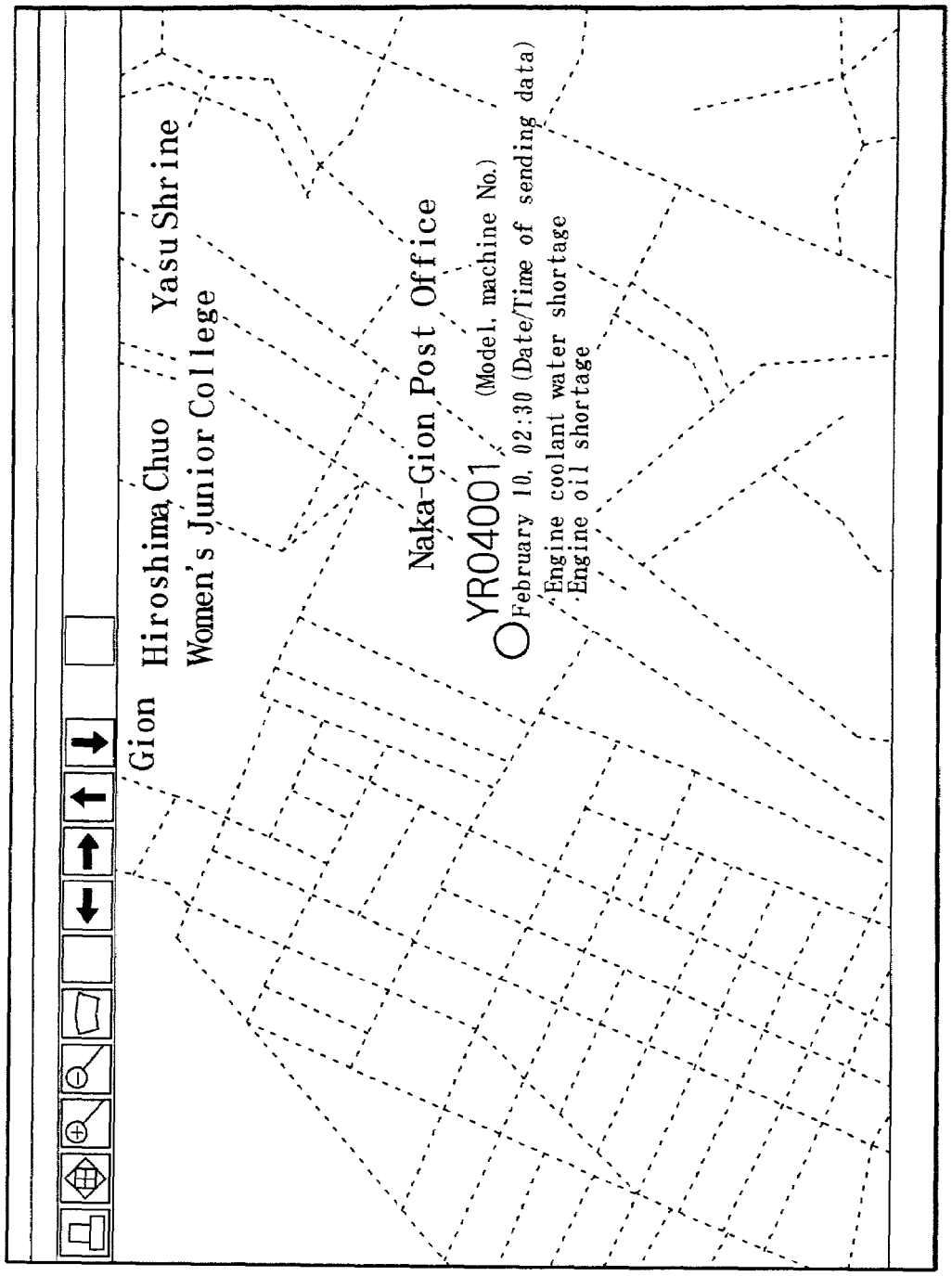
FIG. 3 shows another example of control screen according to one embodiment of the present invention.
Figure 4:
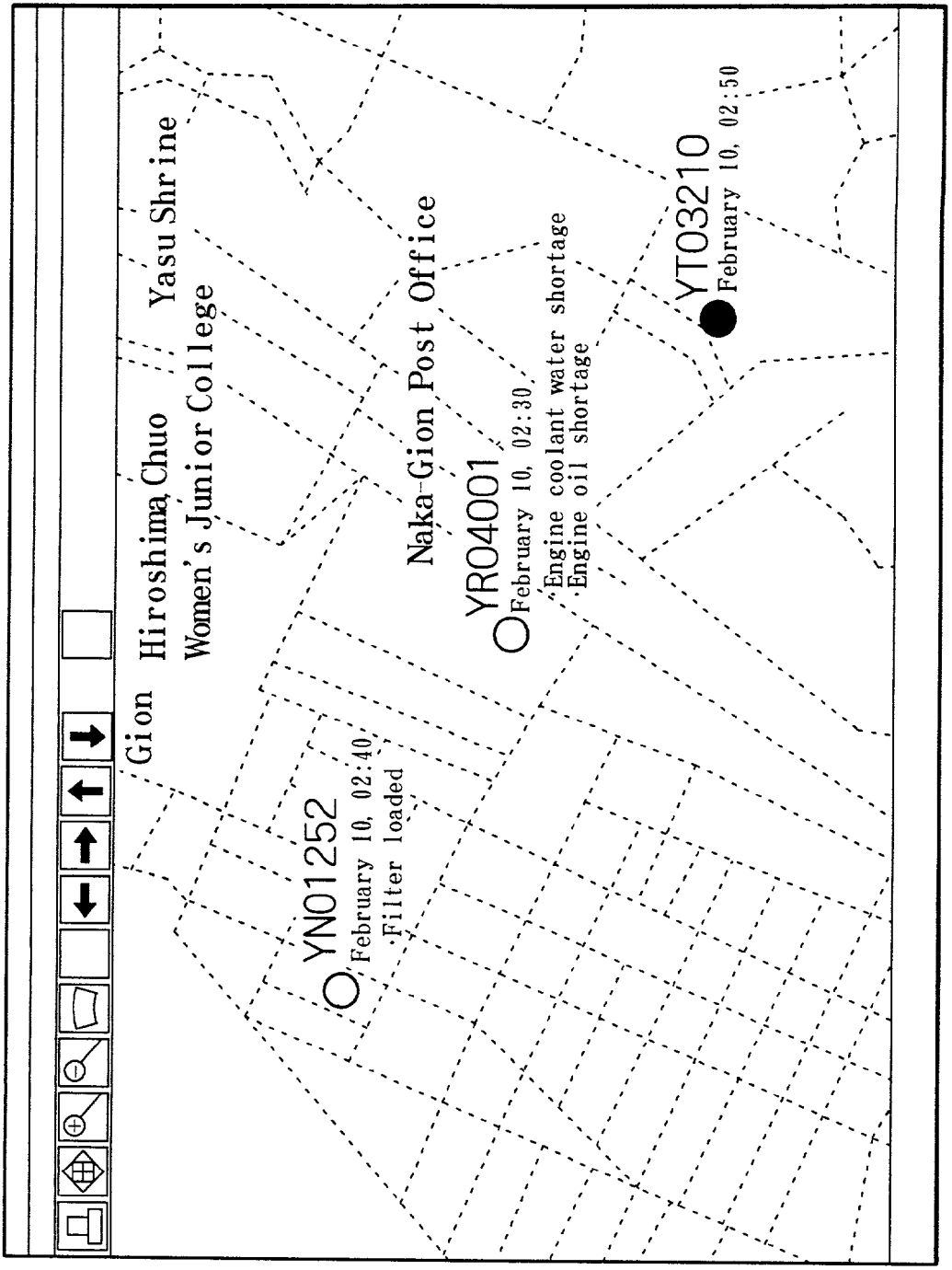
FIG. 4 shows further another example of control screen according to one embodiment of the present invention.

FIG. 2, for example, shows the information as follows. When the information is transmitted at 5:00 on January 6, the construction machine 1 of model and machine number YRO4001 is in operation at the work site and does not need servicing for maintenance. FIG. 3 shows that, when the information is transmitted at 2:30 on February 10, the construction machine 1 of model and machine number YRO4001 is not in operation at the work site and needs servicing for maintenance due to shortages in the engine coolant water and in the engine oil. FIG. 4 shows that other construction machines are deployed around the construction machine 1 shown in FIG. 3. That is, it is shown that the construction machine 1 of model and machine number YNO1252 is not in operation at the construction site and needs servicing due to loaded filter at 2:40 on February 10. It is also shown that the construction machine 1 of model and machine number YTO3210 is in operation at the work site and needs not servicing at 2:50 on February 10. The identification information of the construction machine 1, the date and time when the information was sent, model and machine number and the maintenance works may be displayed together in a box related to the symbol described above.

As shown in FIG. 2 through FIG. 4, showing the current position, model and machine number of the construction machine 1 and whether the machine is in operation or not on the map which is displayed on the monitor screen of the display unit 202 makes it possible to know at a glance where a particular construction machine is located, what maintenance works the machine requires and whether the construction machine is in operation or not. Thus the mechanic can be dispatched in an efficient manner with all the necessary replacement parts being prepared. Particularly according to FIG. 4, since the position information of other construction machines is also displayed, the route the mechanic should follow to successively attend the construction machines can be determined. This enables more efficient operation.

The control PC 20 makes the information, which indicates the operation status and whether maintenance service is required or not for all the construction machines 1, not only displayed on the monitor screen of the display unit 202 but also printed out by the printer 204. Thus the operation status of the construction machine can be known and it can be determined whether the maintenance service is required or not. The machine controller side that has received the information indicating that maintenance service is required from the notifying unit 221 can dispatch a service man to the construction machine 1 which requires the maintenance service at a proper timing when the machine is not in operation.

The communication satellite 30 is an artificial satellite orbiting at a low altitude, for example in a polar orbit at an altitude of around 780 km, which receives the operating information of the construction machine 1 transmitted by the transmitter 184 via the antenna 188 and sends the information to the ground station 32. The ground station 32 stores the operating information of the construction machine 1, which has been received from the satellite 30, in a memory allotted to the control PC 20.

Now the operations to receive and transmit information on the construction machine 1 side of the system, which has the constitution, described above will be outlined below with reference to the flow chart of FIG. 5.

When the engine of the construction machine 1 is started, output signals from the coolant water sensor 24 and other devices are input to the machine controller 12 and are stored as the operating information in the memory 124 by the information writing means 127 along with the clock information sent from the timer 125 (step S1).

The operating information is obtained from the output signals of the key switch unit 10, the coolant water sensor 24, the position sensor 29, etc., as described above. When the key switch unit 10 and the position sensor 29, among these devices, output signals, the information processing means 126 calculates the date and time when the engine was started/stopped and the current position from these output signals, with the calculated values being stored. Output signals from other devices such as the coolant water sensor 24 are stored as they are.

Then the information judging means 129 determines whether all the necessary information is stored as the operating information in the memory 124 (step S3). In case the date and time when the engine was started/stopped, the current position and the coolant water quantity information have been collected, the judgment becomes positive. In this case, the operating information stored in the memory 124 is read out by the information reading means 128, and is transmitted by the transmitting unit 184 via the antenna 188 to the communication satellite 30 (step S5).

The operating information sent to the communication satellite 30 is transmitted to the ground station 32 and is stored in the memory of the ground station 32. The operating information is typically transmitted in the form of compressed data, which is expanded as it was before when taken into the control PC 20.

When the judgment in step S3 is negative, it is determined whether such a command has been received from the control PC 20 that tells to read the operating information stored in the memory 124 and send the information to the communication satellite 30 (step S7). This judgment is carried out by the command information deciphering means 187. The checking means 186 compares the identification information sent from the control PC 20 with the identification information stored in the ROM 182 to determine whether both pieces of information agree or not, and the judging operation is carried out only when the two pieces of information agree.

When the judgment in step S7 is positive, the operation returns to step S5. When the judgment in step S7 is negative, the operation returns to step S1 and the subsequent operations are repeated. When the operating information is transmitted to the communication satellite 30 in step S5, the operating information stored in the memory 124 is deleted.

Now the operations to receive and transmit information on the control PC 20 side of the system, which has the constitution described above, will be outlined below with reference to the flow chart of FIG. 6.

First, the control PC 20 receives the operating information stored in the memory of the ground station 32 (step S21). At this time, according to this embodiment, the operating information is received automatically in order to acquire the information almost in real-time. However, when it is necessary, a request signal which is output from the request signal generating means 209 may be transmitted from the transmitting section 213 to the ground station 32 by the operation of the input section 203, so that the operating information stored in the memory of the ground station 32 can be read in response to this request signal. Thus the operating information that has been read is transmitted from the ground station 32 to the control PC 20. The operating information that has been transmitted is received by the receiving section 214, and is stored in the memory 208 together with the identification information by the information writing means 210.

The operating information stored in the memory 208 is subjected to a predetermined processing operation by the data processing means 211 (step S23). As a result, operation states and the current positions of all the construction machines 1 are collectively controlled by the control PC 20.

Further, the data processing means 211 determines whether the construction machine requires maintenance service or not (step S25). When one of the construction machines 1 is determined to be in necessity of maintenance service, current operating status and the required maintenance works of the construction machine 1 are indicated on the map of the area around the position of the construction machine 1 displayed on the monitor screen of the display unit 202 (step S27). For the other construction machine 1 which is determined to be not in necessity of maintenance service, only the current operating status of the construction machine 1 is indicated on the map of the area around the position of the construction machine 1 displayed on the monitor screen of the display unit 202 (step S29). The printer 204 on recording paper can print out the displayed information so that the operator of the control PC 20 can check it. The operating information stored in the memory 208 remains stored therein until a deletion command signal is output through the operation of the input unit 203.

An operation status display program for a construction machine comprising the steps (S1 through S7, S21 through S29) described above may be stored in a readable recording medium such as flexible disk or may be installed in a computer or the like and used.

According to this embodiment, as described above, operation status of the construction machine 1 can be grasped by the control PC 20 almost in real-time by using the operating information transmitted from the construction machine 1. In the control PC 20 it is determined whether the construction machine 1 is in operation or not in accordance to the operating information that has been received, with the result of judgment being displayed on the monitor screen. This makes it possible to know the timing of carrying out the maintenance service, thus eliminating the need to keep the service man waiting for the end of the operation of the construction machine 1 before starting the maintenance service thereof. As a result, it is made possible to dispatch the service man to the construction machine 1 at the proper timing.

In the embodiment described above, the information processing means 126 uses the output signals from the coolant water sensor 24, the position sensor 29, etc. of the construction machine 1, thereby to determine whether the construction machine is in operation or not and whether maintenance service is required or not, calculates the current position and stores the result of judgment in the memory 124 as the operating information. In another embodiment, the output signals from the coolant water sensor 24, the position sensor 29, etc. may be stored in a predetermined area of the memory 124 and are read at an appropriate timing so that the information processing means 126 calculates the information indicating whether the construction machine is in operation or not and the current position, with the calculated values being stored as the operating information in an area different from the area described above of the memory 124. In this case, burden on the information processing means 126 can be reduced by time-sharing, for better utilization of the processing power of the information processing means 126. In further another embodiment, each piece of information may be transmitted to the control PC 20 as soon as calculated without being stored in the memory 124.

While the GPS is used as the position sensor in the above embodiments, more simplified position information system based on, for example, cellular telephone and personal computer may be employed depending on the distance between the construction machine 1 and the control PC 20.

In the embodiments described above, data processing operations are carried out so as to display the information, which indicates whether the construction machine is in operation or not, on the map that is displayed on the monitor screen of the display unit 202 by the data processing unit 211 of the control PC 20, in order to know the operation status of the construction machine 1. In addition to this scheme, data processing operation may also be carried out so that similar display is given on the small screen of the portable terminal 40 of the service man who is heading to the work site, by sending the information from the notifying unit 221. This enables more efficient operation by sending the information directly to the service man so that he knows the ever-changing operating information.

While a preferred embodiment of the present invention has been disclosed, the present invention is not limited to this embodiment.

What is claimed is:

1. A method for displaying an operation status of construction machines, comprising the steps of:
transmitting operating information obtained from the construction machines to a control device that can communicate with the construction machines, said operating information including identification information which represents a model and machine number of each of the construction machines and transmission date and time of the operating information;
having said control device receive said operating information;
having said control device determine whether the construction machines are in operation or not based on said operating information;
having the control device determine whether it is necessary to provide the construction machines with maintenance service or not based on the operating information; and
displaying, on a monitor screen of said control device, a result determined by said control device as to whether the construction machines are in operation or not and, when it is determined by said control device that maintenance service is necessary, displaying on said monitor screen both the required maintenance service and the result determined as to whether the construction machines are is in operation or not.

2. The method according to claim 1 wherein said operating information includes location information of the construction machines.

3. The meted according to claim 2 wherein said location information is displayed on the monitor screen together with the result.

4. The method according to claim 3 wherein a map of an area including a place where the construction machines are located is displayed on the monitor screen, while the result being superimposed on a position which corresponds to the location information on the map.

5. An apparatus for displaying an operation status of construction machines provided for a control device which can communicate with the construction machines, comprising:
a receiver that receives operating information of the construction machines transmitted from the construction machines, said operating information including identification information which represents a model and machine number of each of the construction machines and transmission date and time of the operating information;

operation status judging means for judging whether the construction machines are in operation or not based on said operating information;

maintenance service judging means provided on the control device for judging whether it is necessary to provide the construction machines with maintenance service or not based on the operating information; and display means for displaying a result of a judgment by said operation status judging means on a monitor screen and, when the maintenance service judging means judges that it is necessary to provide the construction machines with maintenance service, for displaying both a required maintenance service and the result of the judgment by the operation status judging means on the monitor screen.

6. The apparatus according to claim 5 wherein said operating information includes location information of the construction machines and said operation status display means has location display means which displays the location information together with the result of judgment on the monitor screen.

7. The apparatus according to claim 6 wherein said operation status display means has map display means displaying on the monitor screen a map of an area including a place where the construction machines are located, and displaying on the map the result of judgment superimposed on a position which corresponds to the location information.

* * * * *